Patented Aug. 3, 1943

2,325,948

UNITED STATES PATENT OFFICE 2,325,948

SOFTENER FOR SYNTHETIC RUBBER

Benjamin S. Garvey, Jr., Akron, Ohio, assignor to The B. F. Goodrich Company, New York, N. Y., a corporation of New York No Drawing. Application August 26, 1941, Serial No. 408,351

11 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and, unlike natural rubber, is incapable of being masticated to a soft, plastic condition in which it may readily be compounded and processed. Accordingly, it is necessary to employ softeners or plasticizers in order to improve its compounding and processing characteristics. The selection of suitable softeners for synthetic rubber has, however, presented numerous difficulties, particularly in the case of synthetic rubber of the type prepared by the copolymerization of a butadiene-1,3 hydrocarbon and an acrylic nitrile. These difficulties are accentuated by the fact that many softeners ordinarily employed in rubbery or resinous materials are absolutely incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered that tetrahydrofurfuryl esters of polycarboxylic acids are excellent softeners for any of the synthetic rubbers prepared by the polymerization of a butadiene-1,3 hydrocarbon either alone or in admixture with one or more other polymerizable compounds. The use of these softeners with such synthetic rubber not only improves the processing characteristics of unvulcanized composition but also enables vulcanizates of excellent physical properties to be produced. Accordingly this invention comprises both unvulcanized and vulcanized synthetic rubber composition containing as a softener therefor a tetrahydrofurfuryl ester of a polycarboxylic acid. The specific advantages attending the use of these softeners will appear hereinafter.

Included as softeners in this invention are the esters of polycarboxylic acids wherein the hydrogen atom of at least one carboxyl group is replaced by a tetrahydrofurfuryl radical and also the esters wherein the hydrogen atom of each carboxyl group is replaced by a tetrahydrofurfuryl radical. Mixed esters wherein the hydrogen atom of one carboxyl group is replaced by a tetrahydrofurfuryl radical and the hydrogen atom of another carboxyl group is replaced by a monohydric alcohol radical such as ethyl, propyl, butyl, amyl, benzyl, cyclohexyl, ethoxyethyl and similar radicals, are also included. The polycarboxylic acid may be a saturated aliphatic dibasic acid such as oxalic, malonic, succinic, glutaric, adipic, pimelic, suberic, azelaic, sebacic or the like; an unsaturated aliphatic dicarboxylic acid such as maleic, fumaric, citraconic, mesaconic, itaconic or the like; an aromatic dicarboxylic acid such as phthalic or terephthalic; a saturated or unsaturated aliphatic or an aromatic polycarboxylic acid containing more than two carboxyl groups such as aconitic, tricarballylic acid, trimellitic acid or the like or any other similar polycarboxylic acid. The preferred softeners are the ditetrahydrofurfuryl esters of dibasic acids containing from 6 to 10 carbon atoms, inclusive.

As mentioned hereinabove, these esters may be employed as softeners for synthetic rubber prepared by the polymerization of a butadiene-1,3 hydrocarbon by which is meant butadiene-1,3 and its homologs which polymerize in essentially the same manner such as isoprene, 2-3 dimethyl butadiene-1,3, piperylene, etc., either alone or in admixture with another butadiene-1,3 hydrocarbon or with other unsaturated monomers copolymerizable therewith. Among such unsaturated monomers copolymerizable with a butadiene-1,3 hydrocarbon to form synthetic rubber, there may be mentioned the aryl olefins such as styrene and vinyl naphthalene, the alpha methylene, carboxylic acids, esters and nitriles such as acrylic acid, methyl acrylate, methyl methacrylate, acrylonitrile, methacrylonitrile and the like, isobutylene, vinylidene chloride and other unsaturated hydrocarbons, esters, alcohols, ethers, etc., which contain the polymerizable structure

where at least one of the disconnected valencies is attached to an electroactive group, that is, a group which substantially increases the electrical dissymmetry or polar character of the molecule. The polymerization to form a synthetic rubber may be accomplished by any of the well known methods such as homogeneous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent. The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber, but amounts smaller or larger than this are also effective. With synthetic rubber prepared by the copolymerization of butadiene and styrene or of butadiene and acrylic esters it is possible to use smaller amounts of softener than are required with rubber prepared by the copolymerization of butadiene and acrylonitrile.

In one example of this invention a softened synthetic rubber composition is prepared by incorporating 50 parts by weight of ditetrahydrofurfuryl sebacate in 100 parts by weight of a synthetic rubber prepared by the copolymerization in aqueous emulsion of 55 parts by weight of butadiene and 45 parts by weight of acrylonitrile. The softener adds rapidly to the rubber to produce a soft, exceptionally plastic stock. The milling and processing characteristics of the batch are greatly improved by the addition of the softener. The conventional compounding and vulcanizing ingredients including carbon black, sulfur and vulcanization accelerators are then added. The carbon black and sulfur are dispersed in the softened composition much easier than with many compositions containing other softeners. The composition has some tack but when brushed with an organic solvent such as acetone, ethyl acetate, methyl ethyl ketone, chlortoluene or the like it develops excellent building tack. The development of tack when a solvent is brushed on the composition appears to be at least partly a function of the softener employed, for the substitution of many other softeners, in the above composition results in the production of a stock which cannot be so tackified.

When the above composition is vulcanized, a vulcanizate having excellent tensile strength and ultimate elongation is obtained. Tensile strength and elongation are both superior to those which may be obtained with other ester softeners such as dibutyl phthalate. The vulcanized stock also exhibits a high rebound, resembling vulcanized natural rubber. The softener does not appreciably leach out of the vulcanized composition even when it is immersed in hexane for 48 hours and the composition retains the excellent oil resistance of an unsoftened butadiene acrylonitrile copolymer.

In another embodiment of this invention the above example is repeated using 50 parts of ditetrahydrofurfuryl azelate as the softener. This amount of softener is completely added on a roll mill to 100 parts by weight of synthetic rubber in only 14 minutes while most softeners require about twice this long. The unvulcanized composition is exceedingly plastic, absorbs compounding and vulcanizing ingredients readily and produces a vulcanizate having the same desirable properties described in the example above. The substitution of monotetrahydrofurfuryl sebacate as the softener also produces equivalent results.

In still another embodiment, 50 parts by weight of ditetrahydrofurfuryl phthalate is incorporated on a roll mill into 100 parts by weight of a synthetic rubber prepared by the copolymerization in aqueous emulsion of 75 parts by weight of butadiene and 25 parts by weight of acrylonitrile. The unsoftened rubber is extremely difficult to work especially on a hot mill. After the addition of the softener, however, which requires only 8 minutes, the stock exhibits good hot milling characteristics. It is soft, plastic and somewhat tacky. When compounded and vulcanized, this composition yields a vulcanizate having a high rebound elasticity, low durometer hardness and low permanent set as well as good tensile strength and elongation and excellent oil resistance. The substitution of ditetrahydrofurfuryl adipate for the phthalic ester produces equally good results, in this case the addition of the softener only requiring 6 minutes.

Tetrahydrofurfuryl esters may also be used advantageously in other synthetic rubbers. For example, the incorporation of only 10 parts by weight of ditetrahydrofurfuryl sebacate into 100 parts by weight of a synthetic rubber prepared by the copolymerization of 75 parts by weight of butadiene and 25 parts by weight of styrene produces a soft plastic composition greatly superior to that obtained by heat-softening this synthetic rubber. Copolymers of butadiene and acrylic esters such as methyl acrylate or methyl methacrylate as well as copolymers of butadiene and vinylidene chloride are also softened effectively by tetrahydrofurfuryl esters.

Other materials such as natural rubber, other softeners, pigments, fillers, vulcanizing agents, accelerators, antioxidants and the like may be included in the compositions herein described. Other modifications which will be apparent to those skilled in the art are within the spirit and scope of the invention as defined by the appended claims.

I claim:

1. A composition of matter comprising a synthetic rubber prepared by the polymerization of a butadiene-1,3 hydrocarbon and, as a softener therefor, an ester of a polycarboxylic acid wherein the hydrogen atom of at least one carboxyl group is replaced by a tetrahydrofurfuryl radical.

2. A composition of matter comprising a synthetic rubber prepared by the copolymerization of a butadiene-1,3 hydrocarbon and at least one other unsaturated compound which contains a

group and is copolymerizable therewith, and, as a softener therefor, an ester of a polycarboxylic acid wherein the hydrogen atom of at least one carboxyl group is replaced by a tetrahydrofurfuryl radical.

3. A composition of matter comprising a synthetic rubber prepared by the polymerization of a butadiene-1,3 hydrocarbon and, as a softener therefor, an ester of a dicarboxylic acid wherein the hydrogen atom of each carboxyl group is replaced by a tetrahydrofurfuryl radical.

4. A composition of matter comprising a synthetic rubber prepared by the copolymerization of a butadiene-1,3 hydrocarbon and at least one other unsaturated compound which contains a

group and is copolymerizable therewith, and, as a softener therefor, a ditetrahydrofurfuryl ester of a dicarboxylic acid, said acid containing from 6 to 10 carbon atoms, inclusive.

5. A vulcanized synthetic rubber composition comprising a copolymer of a butadiene-1,3 hydrocarbon and at least one other unsaturated compound which contains a

group and is copolymerizable therewith, and as a softener therefor, an ester of a polycarboxylic acid wherein the hydrogen atom of at least one carboxyl group is replaced by a tetrahydrofurfuryl radical.

6. A composition of matter comprising a synthetic rubber prepared by copolymerizing in aqueous emulsion butadiene and acrylonitrile and, as a softener therefor, an ester of a polycarboxylic acid wherein the hydrogen atom of at least one carboxyl group is replaced by a tetrahydrofurfuryl radical.

7. A composition of matter comprising a synthetic rubber prepared by copolymerizing in aqueous emulsion butadiene and styrene and, as a softener therefor, an ester of a polycarboxylic acid wherein the hydrogen atom of at least one carboxyl group is replaced by a tetrahydrofurfuryl radical.

8. The composition of claim 6 wherein the softener is a ditetrahydrofurfuryl ester of a dicarboxylic acid containing from 6 to 10 carbon atoms.

9. The composition of claim 6 wherein the softener is ditetrahydrofurfuryl phthalate.

10. The composition of claim 6 wherein the softener is ditetrahydrofurfuryl azelate.

11. The composition of claim 7 wherein the softener is ditetrahydrofurfuryl sebacate.

BENJAMIN S. GARVEY, JR.